US008387921B2

(12) United States Patent
Taylor et al.

(10) Patent No.: US 8,387,921 B2
(45) Date of Patent: *Mar. 5, 2013

(54) SELF DEPLOYING SOLAR ARRAY

(75) Inventors: Robert Taylor, Superior, CO (US);
Philip N. Keller, Longmont, CO (US);
Kaushik Mallick, Thornton, CO (US);
Dana Turse, Broomfield, CO (US);
Michael J. Hulse, Erie, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/036,910

(22) Filed: Feb. 28, 2011

(65) Prior Publication Data
US 2011/0210209 A1 Sep. 1, 2011

Related U.S. Application Data

(63) Continuation-in-part of application No. 12/873,615, filed on Sep. 1, 2010, now Pat. No. 8,061,660, which is a continuation of application No. 11/695,163, filed on Apr. 2, 2007, now Pat. No. 7,806,370.

(60) Provisional application No. 60/788,449, filed on Mar. 31, 2006, provisional application No. 61/310,205, filed on Mar. 3, 2010.

(51) Int. Cl.
*B64G 1/22* (2006.01)

(52) U.S. Cl. ............... 244/172.7; 244/173.3; 244/169.4; 244/159.5; 244/159.6; 244/172.6; 136/245; 136/292

(58) Field of Classification Search ............... 244/159.4, 244/159.5, 159.6, 172.6, 120, 119, 122 A, 244/158.1, 172.7, 173.3; 136/245, 292
See application file for complete search history.

(56) References Cited

U.S. PATENT DOCUMENTS

| 3,165,751 | A | | 1/1965 | Clark | |
|---|---|---|---|---|---|
| 3,473,758 | A | * | 10/1969 | Valentijn | 244/172.7 |
| 3,477,662 | A | * | 11/1969 | Anderson | 244/172.7 |
| 3,510,086 | A | * | 5/1970 | Lanz et al. | 244/172.6 |
| 3,735,942 | A | | 5/1973 | Palz | |
| 3,735,943 | A | | 5/1973 | Fayet | |
| 3,817,481 | A | | 6/1974 | Berks et al. | |
| 3,819,417 | A | | 6/1974 | Haynos | |
| 3,863,870 | A | | 2/1975 | Andrews et al. | |
| 4,133,501 | A | | 1/1979 | Pentlicki | |
| 4,475,323 | A | | 10/1984 | Schwartzberg et al. | |
| 4,636,579 | A | | 1/1987 | Hanak et al. | |
| 4,713,492 | A | | 12/1987 | Hanak | |
| 4,727,932 | A | * | 3/1988 | Mahefkey | 165/41 |
| 4,747,567 | A | | 5/1988 | Johnson et al. | |
| 4,787,580 | A | * | 11/1988 | Ganssle | 244/172.6 |

(Continued)

OTHER PUBLICATIONS

International Search Report and Written Opinion of PCT/US2011/026437 mailed on Jun. 27, 2011, 10 pages.

(Continued)

*Primary Examiner* — Tien Dinh
*Assistant Examiner* — Justin Benedik
(74) *Attorney, Agent, or Firm* — Kilpatrick Townsend & Stockton LLP

(57) ABSTRACT

A deployable structure that may include a slit-tube longeron and a flat panel coupled with the slit-tube longeron. The slit-tube longeron may include a tubular member having a slit that runs along the longitudinal length of the slit-tube longeron. The deployable structure may be configured to couple with a satellite. And the deployable structure may be configured to transform between a stowed state and a deployed state where the tubular member is substantially straight when the deployable structure is in the deployed state, and the tubular member is wrapped around the satellite when the deployable structure is in the stowed state.

28 Claims, 16 Drawing Sheets

U.S. PATENT DOCUMENTS

| | | | |
|---|---|---|---|
| 5,235,788 A * | 8/1993 | Maimets | 52/108 |
| 5,296,044 A | 3/1994 | Harvey et al. | |
| 5,487,791 A | 1/1996 | Everman et al. | |
| 5,520,747 A * | 5/1996 | Marks | 136/245 |
| 5,720,452 A * | 2/1998 | Mutschler, Jr. | 244/172.7 |
| 5,785,280 A | 7/1998 | Baghdasarian | |
| 5,833,176 A | 11/1998 | Rubin et al. | |
| 5,857,648 A | 1/1999 | Dailey et al. | |
| 5,927,654 A * | 7/1999 | Foley et al. | 244/172.6 |
| 6,017,002 A | 1/2000 | Burke et al. | |
| 6,137,454 A * | 10/2000 | Peck | 343/912 |
| 6,228,441 B1 | 5/2001 | Suzuki et al. | |
| 6,343,442 B1 | 2/2002 | Marks | |
| 6,374,565 B1 * | 4/2002 | Warren | 52/653.2 |
| 6,437,232 B1 * | 8/2002 | Dailey et al. | 136/245 |
| 6,478,261 B2 | 11/2002 | Laraway et al. | |
| 6,547,190 B1 * | 4/2003 | Thompson et al. | 244/172.7 |
| 6,568,638 B1 * | 5/2003 | Capots | 244/159.4 |
| 6,581,883 B2 | 6/2003 | McGee et al. | |
| 6,609,683 B2 | 8/2003 | Bauer et al. | |
| 6,637,702 B1 * | 10/2003 | McCandless | 244/172.6 |
| 6,702,976 B2 | 3/2004 | Sokolowski | |
| 6,772,479 B2 | 8/2004 | Hinkley et al. | |
| 6,775,046 B2 | 8/2004 | Hill et al. | |
| 6,872,433 B2 * | 3/2005 | Seward et al. | 428/36.9 |
| 6,983,914 B2 | 1/2006 | Stribling et al. | |
| 7,806,370 B2 | 10/2010 | Beidleman et al. | |
| 8,061,660 B2 | 11/2011 | Beidleman et al. | |
| 8,066,227 B2 | 11/2011 | Keller et al. | |
| 8,109,472 B1 | 2/2012 | Keller et al. | |
| 2002/0096603 A1 | 7/2002 | Bauer et al. | |
| 2005/0178921 A1 | 8/2005 | Stribling et al. | |
| 2007/0262204 A1 | 11/2007 | Beidleman et al. | |
| 2012/0012154 A1 | 1/2012 | Keller et al. | |
| 2012/0090660 A1 | 4/2012 | Keller et al. | |

OTHER PUBLICATIONS

Spence, Brian R., et al., "Mars Pathfinder Rover Egress Deployable Ramp Assembly", 30$^{th}$ Aerospace Mechanisms Symposium, NASA Langley Research Center, May 15-17, 1996, 16 pages.

International Search Report and Written Opinion of PCT/US2011/023782 mailed on Apr. 4, 2011, 7 pages.

International Search Report and Written Opinion of PCT/US2011/026745 mailed on May 10, 2011, 10 pages.

* cited by examiner

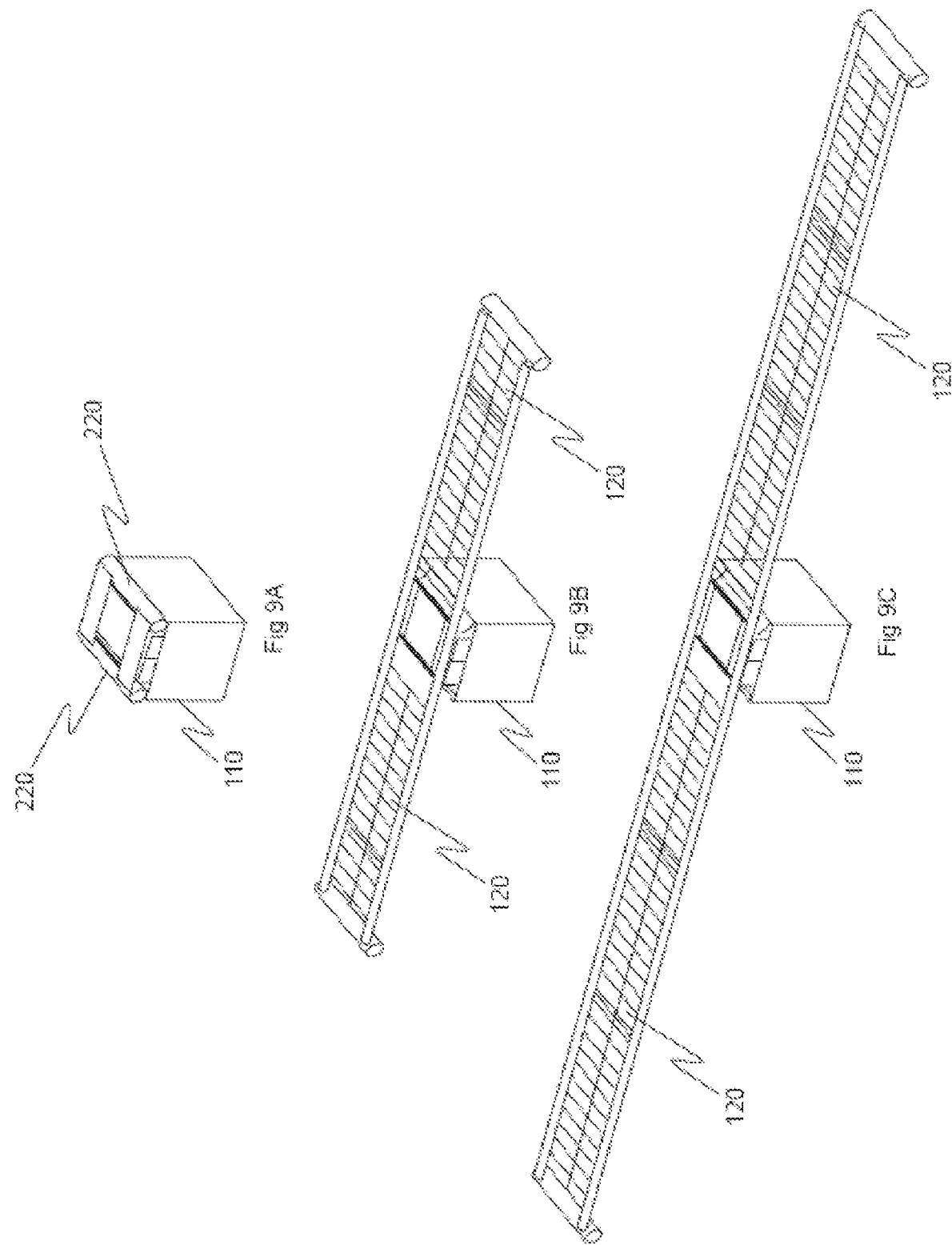

SELF DEPLOYING SOLAR ARRAY

CROSS-REFERENCES TO RELATED APPLICATIONS

This application is a continuation-in-part, and claims the benefit, of co-pending, commonly assigned U.S. patent application Ser. No. 12/873,615, filed Sep. 1, 2010, entitled "Large-Scale Deployable Solar Array," which is a continuation of U.S. patent application Ser. No. 11/695,163, filed Apr. 2, 2007, entitled "Large-Scale Deployable Solar Array," which is a non-provisional of and claims the benefit of co-pending, commonly assigned, U.S. Provisional Application No. 60/788,449, filed on Mar. 31, 2006, entitled "Large-Scale Deployable Solar Array," the entirety of which is herein incorporated by reference for all purposes. This application is also a non-provisional of and claims the benefit of U.S. Provisional Application No. 61/310,205, filed on Mar. 3, 2010, entitled "Collapsible Structures," the entirety of which is herein incorporated by reference for all purposes.

STATEMENT AS TO RIGHTS TO INVENTIONS MADE UNDER FEDERALLY SPONSORED RESEARCH OR DEVELOPMENT

The U.S. Government may have rights to this invention pursuant to Contracts No. FA9453-04-M-0302 and W9113M-10-C-0012.

BACKGROUND OF THE INVENTION

This invention relates to the field of rocket launched spacecraft and, in particular, to deployable spacecraft structures such as arrays and booms (e.g., solar arrays, radio frequency antennas, planar arrays, phased arrays, etc).

Most deployable solar arrays for spacecraft have used crystalline solar cells mounted to rigid panels. Certain prior art describes mechanisms to effectively package, carefully deploy, and maintain the shape of arrays of rigid panels. Flexible solar arrays have also been used, but have been limited to thin-film arrays packaged in a long roll or pleated stack that is deployed using a separate boom or booms.

Thin photovoltaic arrays have been used for the original solar arrays on the Hubble Space Telescope and for the primary solar arrays on the International Space Station (ISS). The Hubble arrays were packaged in a roll and deployed with booms mounted on either side of the roll that pull the roll out into a sheet as they extend. The ISS arrays were packaged into a stack by folding and pleating a long, thin sheet of material that is deployed with a single boom mounted underneath the array that pulls the stack into a sheet as it extends.

BRIEF SUMMARY OF THE INVENTION

Structures and methods are disclosed regarding deployable structures that may be coupled with a satellite. According to one embodiment, a deployable structure may include a slit-tube longeron having a tubular member that includes a slit along the longitudinal length of the slit-tube longeron. The deployable structure may also include a first flat panel coupled with the slit-tube longeron. The deployable structure may be configured to couple with a satellite. The deployable structure may also be configured to transform between a stowed state and a deployed state where the tubular member of the slit-tube longeron is substantially straight when the deployable structure is in the deployed state, and the tubular member of the slit-tube longeron is wrapped around the satellite when the deployable structure is in the stowed state so that the tubular member bends around the satellite.

When the deployable structure is in the stowed state, the first flat panel may be positioned adjacent to a flat surface of the satellite so that the first flat panel lays substantially flat adjacent to the flat surface of the satellite. A portion of the slit-tube longeron that is coupled with the first flat panel may bend when the deployable structure is in the stowed state. The slit-tube longeron may include a shape memory material. When in the deployed state, the tubular member may have a substantially circular cross section along the longitudinal length of the slit-tube longeron. The slit of the tubular member may allow the tubular member to flatten along the longitudinal length of the slit-tube longeron so that the tubular member is substantially flat. Flattening the tubular member may facilitate wrapping the deployable member around the satellite.

The deployable structure may further include a second flat panel coupled with the slit-tube longeron. When the deployable structure is in the stowed state, the first flat panel and the second flat panel may lie substantially flat adjacent to the outer surface of the satellite. The first flat panel and the second flat panel may be coupled along the longitudinal length of the slit-tube longeron. The first flat panel and second flat panel may be longitudinally separated by a portion of the tubular member. The portion of the tubular member separating the first flat panel and second flat panel may bend around the outer surface of the satellite when the deployable structure is in the stowed state.

The deployable structure may additionally include a force applicator configured to apply a force to the slit-tube longeron to change the orientation of the first flat panel along the longitudinal length of the slit-tube longeron. The force applicator may provide a shear force along the slit of the tubular member. The force applicator may include a piezoelectric material, a mechanical actuator, a motor, and/or a shape memory wire. The slit-tube longeron may include a joint that allows a portion of the tubular member to rotate in response to the applied force while reducing the rotation in another portion of the tubular member. The first flat panel and/or the second flat panel may comprise a solar array.

Transforming from the stowed state to the deployed state may include unwrapping the tubular member from around the satellite body so that the tubular member is substantially straight having a roughly circular cross section along the longitudinal length of the slit-tube longeron. In addition, Transforming from the stowed state to the deployed state may occur automatically.

According to another embodiment, a method for stowing a deployable structure having a slit-tube longeron and a first flat panel may include coupling the first flat panel with the slit-tube longeron, where the first flat panel is coupled toward a first end of the slit-tube longeron. The method may also include coupling the deployable structure with a satellite at a second end of the slit-tube longeron. The method may further include wrapping the slit-tube longeron around the satellite so that the slit-tube longeron bends around the outer surface of the satellite.

The method may additionally include deploying the deployable structure. Deploying the deployable structure may include unwrapping the slit-tube longeron from around the satellite so that the slit-tube longeron is roughly straight having a roughly circular cross section along a longitudinal length of the slit-tube longeron. The slit-tube longeron may include a tubular member having a slit along a longitudinal length of the slit-tube longeron and the method may additionally include coupling a force applicator with the slit-tube longeron, where the force applicator provides a shear force along the slit of the tubular member to change the orientation of the first flat panel in relation to the satellite. In response to the shear force provided by the force applicator, the second end of the slit-tube longeron may rotate along the longitudinal length of the slit-tube longeron to change the orientation of the first flat panel. The slit-tube longeron may include a joint that allows the second end of the slit-tube longeron to rotate while reducing rotation in the first end of the slit-tube longeron.

According to a further embodiment, a flexible solar array sheet may be configured for coupling with a slit-tube longeron. The flexible solar array sheet may include a first end, a second end opposite the first end, a first side, a second side opposite the first side, and a plurality of photovoltaic cells coupled with the flexible solar array sheet. The flexible solar array sheet may be roughly rectangular having a surface defined by the first end, the second end, the first side, and the second side. Each photovoltaic cell of the plurality of photovoltaic cells may be separated from an adjacent photovoltaic cell by a gap that may include a portion of the flexible solar array sheet. The plurality of photovoltaic cells may be arranged across the surface of the flexible solar array sheet so as to allow the flexible solar array sheet and the plurality of photovoltaic cells to be stowed as a roll. Stowing as a roll may be facilitated due to the flexibility of the solar array sheet in each of the gaps. The roll may be configured to deploy by being rolled along the length of the solar array sheet.

The plurality of photovoltaic cells may be arranged in columns and rows, where each column is roughly parallel with the first side and each row is roughly parallel with the first end. A gap may separate each row from an adjacent row. The photovoltaic cells in each row may be coupled together by a conductive material. The solar array may further include a slit-tube longeron coupled with the solar array sheet. The slit-tube longeron may be roughly parallel with the first side when coupled with the solar array sheet. The slit-tube longeron may be configured to stow as a roll with the solar array sheet and the plurality of photovoltaic cells (rigid or flexible) by rolling the slit-tube longeron, the solar array, and the plurality of photovoltaic cells along the length of the solar array sheet. The solar array may additionally include a gimbal mount coupled with the slit-tube longeron. The gimbal mount may be coupled with a satellite to thereby couple the slit-tube longeron and solar array sheet with the satellite.

According to a further embodiment, a deployable structure may include a slit-tube longeron, a flat solar array sheet coupled with the slit-tube longeron; and a plurality of photovoltaic cells coupled with the flat solar array sheet. The slit-tube longeron may include a tubular member having a slit along the longitudinal length of the slit-tube longeron. The slit-tube longeron and the flat solar array sheet may be stowed as a roll comprising the one or more slit-tube longerons and the flat solar array sheet. The roll may be configured to deploy by being rolled along the longitudinal length of the slit-tube longeron.

BRIEF DESCRIPTION OF THE DRAWINGS

FIGS. 9A-C show a bi-directional deployment of solar array structures according to one embodiment of the invention.

DETAILED DESCRIPTION OF THE INVENTION

Figure 1:
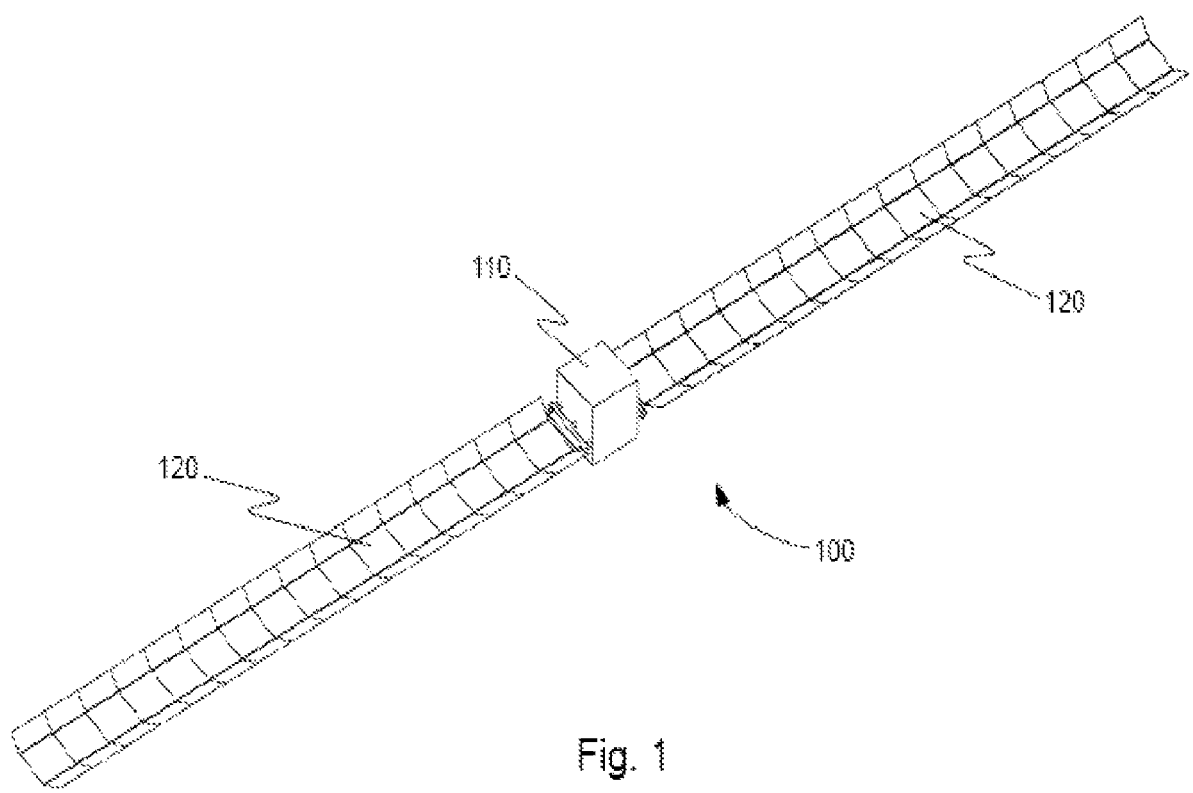
FIG. 1 shows a two solar array structures coupled with a spacecraft according to one embodiment of the invention.

Spacecraft are limited in power, stowed volume, and mass available to meet requirements. These parameters are traded against each other as well as overall cost in spacecraft design. More efficient solar array packaging and mass would allow spacecraft to have more power on orbit or the same power for less mass and stowed volume. Additional power could be used, for example, to increase services for RF communications, provide power for electric propulsion, or increase the science capability of exploratory spacecraft. Similarly, additional stowed volume could be used, for example, for additional antennas for RF communications or larger science instruments. Also, a simpler solar array design could be fabricated and tested for a lower cost. Because of the extremely constrained nature of spacecraft design and because nearly all spacecraft require solar arrays for power, solar arrays with greater mass and volume efficiency could be used to increase the capability or decrease the cost of a spacecraft for any mission.

For purposes of illustration only, embodiments of the invention are described herein in regard to a solar array subsystem which is deployed from an on-orbit spacecraft in zero gravity. Those skilled in the art will recognize that the embodiments of the invention may be applied to other applications.

One embodiment of the invention provides for one or more slit-tube longerons coupled with one or more flat sheets of solar array material. The slit-tube longerons may be back rolled with the flat sheets when stored and prior to deployment. The slit-tube longerons may also be made out a shape memory material that unrolls when exposed to heat, such as provided by sunlight. The longerons may be coupled with a gimbal structure that in turn may be coupled with a spacecraft.

Another embodiment of the invention provides for a method for stowing a structure having one or more slit-tube longerons and one or more flat sheets. The method may include coupling the one or more slit-tube longerons with the one or more flat sheets and rolling the one or more slit-tube longerons and the one or more flat sheets together into a roll from an end of the structure back to a base of the structure. The method may also include applying heat to the longerons prior to and during the rolling of the longerons. The method may further include securing the rolled longerons and flat sheets with a clamp. The method may also include attaching the one or more longerons to a gimbal structure that is attached to a spacecraft. This method may specifically be used to deploy a solar array comprising a blanket of solar cells.

Another embodiment of the invention provides for a method for deploying a rolled structure having one or more slit-tube longerons and one or more flat sheets. The method may include heating the one or more longerons, for example, by exposing the one or more longerons to the sun. Allowing the rolled structure to unroll in response to heat from the sun. The method may also include unclamping the roll. Further, the method may also include positioning the rolled structure in such a way to increase the solar radiation incident on the rolled structure.

Turning first to FIG. 1, a spacecraft 110 is shown with two deployed solar array structures 120 according to one embodiment of the invention. The solar array structures may be of any dimension. For example, each solar array structure 120 may be 5 feet across and 20 feet long (measured from the satellite to the end of the solar array). As another example, each solar array structure may be 20 feet wide and 50 feet long. As yet another example, each solar array structure may be 40 feet wide and 112 feet long. The size of the solar array may depend on the needs of the specific application, based in part, for example, on power needs, weight, and cost, but is not limited by the embodiments of the invention.

Figure 2:
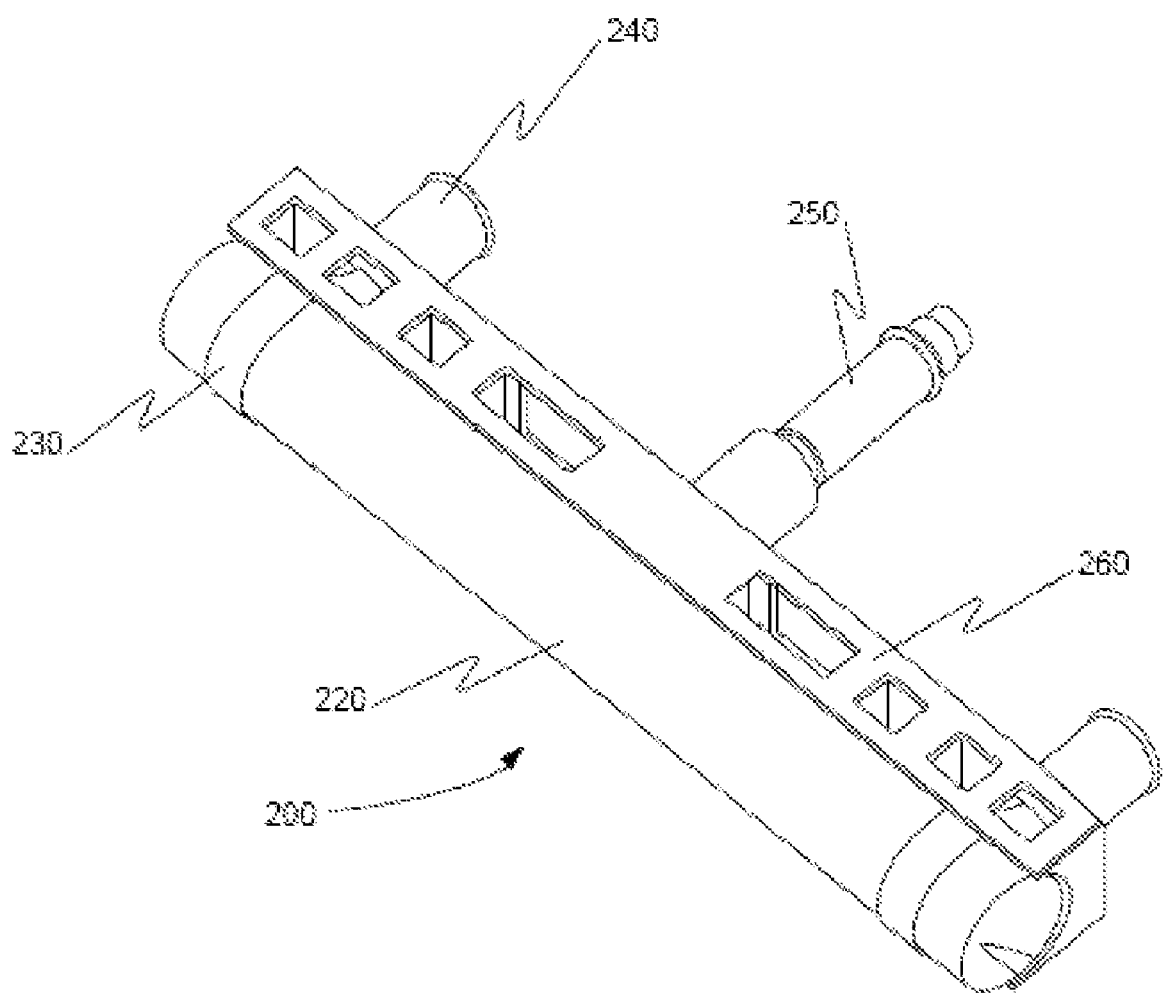
FIG. 2 shows a solar array structure in the rolled position coupled and stowed with a yoke according to one embodiment of the invention.

FIG. 2 shows an undeployed, rolled solar array structure 220 attached to a yoke 260 according to one embodiment of the invention. The yoke 260 may be attached to a gimbal 250. The gimbal 250 may provide rotation of the solar array structure 120 in multiple dimensions. For example, the gimbal 250 may allow the structure, and hence the solar array structure 120 in this case, to be pointed toward the sun by the spacecraft 110 and its control system. Outboard from the gimbal 250 mount is a yoke 260. The yoke 260 may provide a load path between the solar array structure 120 and the gimbal 250 mount. It also provides a mechanism for supporting the rolled solar array, for example, during launch, deployment and while stowed in a rolled position.

Figure 3:
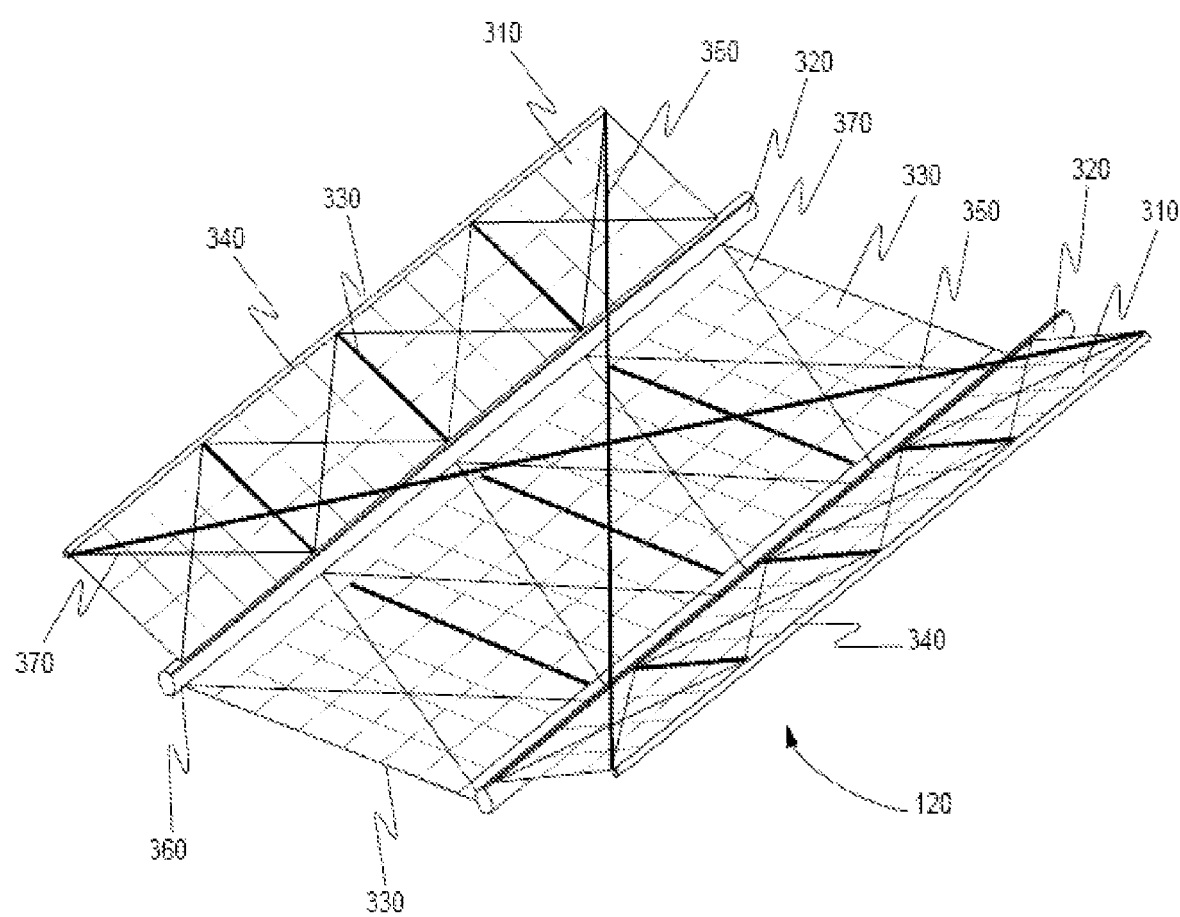
FIG. 3 shows a deployed solar array structure according to one embodiment of the invention.

FIG. 3 shows a solar array structure 120 in more detail according to one embodiment of the invention. This solar array has a central solar panel 300 and two wing solar panels 310. In this embodiment, the wing solar panels 310 are deployed to an angle not coplanar with the central solar panel 300. The wing solar panels 310 may alternatively be deployed coplanar with the central solar panel 300. Other embodiments of the invention may include a single central solar panel 300 without wing solar panels 310. Moreover, another embodiment may include a single central solar panel 300 and a single wing solar panel 310.

The solar array structure 120 may include two primary longerons 320, lateral battens 330, and wing edge longerons 340. The primary longerons 320 and the lateral battens 330 form structural panels. Other longerons and battens may be included for structural stability. Moreover, battens and longerons are not required. The central solar panel 300 and the wing solar panels 310 may be photovoltaic blankets. These photovoltaic blankets may include photovoltaic cells, such as, for example, silicon photovoltaic cells. The photovoltaic blankets may be, for example, thin film photovoltaics on a structural substrate or rigid cell photovoltaics on a mesh fabric. The photovoltaic cells may be grouped into panels. The photovoltaic cells may also be thin film photovoltaic cells. For example, the photovoltaic cells may include an amorphous silicon alloy or copper indium gallium deselinide cells deposited on a thin metallic or polyimide substrate.

Photovoltaics may be mounted on blanket assemblies and attached to a frame at junction points 360 along one of the primary longerons 320. Cable-style diagonals 370 may be included to stiffen both the central and wing solar panels. Wing diagonals 350 connecting and supporting the two wing solar arrays may also be included. The diagonals provide shear and torsional rigidity when the structure is fully deployed.

Figure 4:
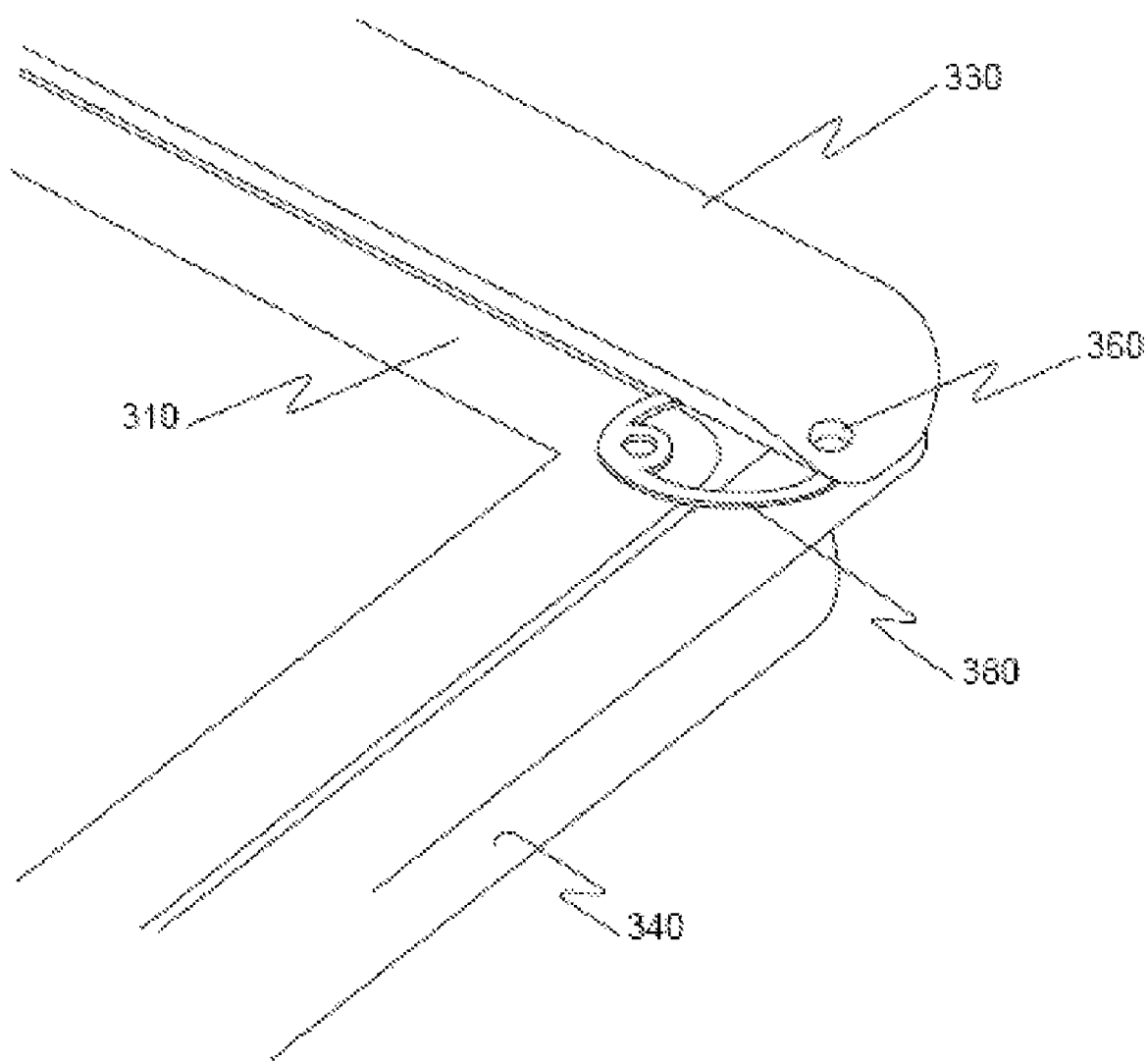
FIG. 4 shows a clip used to attach a solar blanket to a support structure according to one embodiment of the invention.

According to another embodiment of the invention, photovoltaic blankets may be attached to the frame junctions with clips 380 as shown in FIG. 4. The clips 380 may be attached at the junction point 360 of an wing edge longeron 340 and a batten 330. The clips 380 may allow for easy installation and removal of the photovoltaic blankets. They may include a spring to provide the preload necessary to tension the blanket inside of the frame sections. The soft spring also decreases the change in blanket tension due to manufacturing tolerances and any on-orbit distortions. The clips 380 with springs may also be set to decrease or eliminate tension being applied to the photovoltaic blanket. The photovoltaic blankets may be attached to the frame using other devices, such as for example, grommets, elastic cords, etc.

Figure 5:
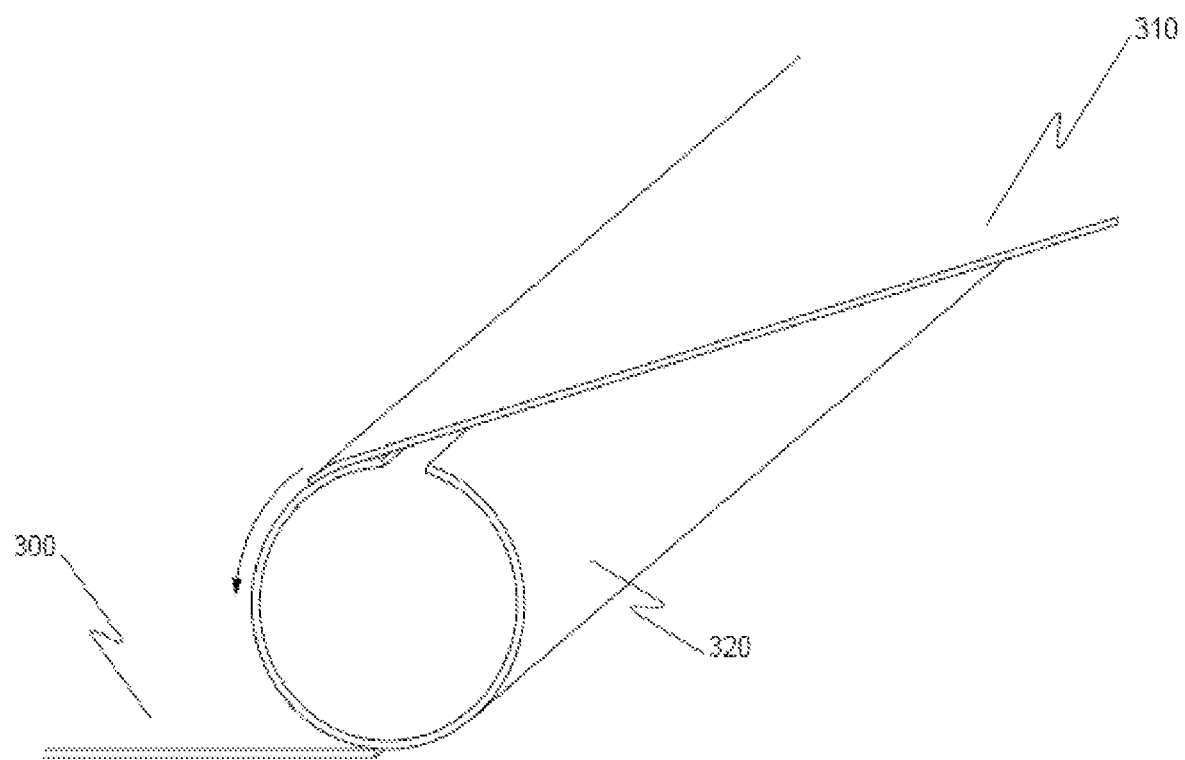
FIG. 5 shows a close up of a slit-tube longeron coupled with a central and wing solar panel according to one embodiment of the invention.

FIG. 5 shows a close up of a slit-tube primary longeron 320 coupled with a wing solar panel 310 and a central solar panel 300. The longerons are constructed such that they may be flattened and rolled for stowage while regaining their original cross-section during deployment. The primary longeron 320 may be a long tube with one or more slits 25. The slits may allow the tube to be flattened and rolled. The primary longeron 320 may be constructed from any elastic material or memory material, such as, for example, a metal, a composite, or a polymer. Many shape memory materials are known in the art. For example, the primary longerons 320 may comprise copper-zinc-aluminum, copper-aluminum-nickel, or nickel-titanium alloys. In another embodiment of the invention, the primary longerons 320 may be constructed from an elastic memory composite (EMC) material, such as, for example, TEMBO®, which is commercially available from Composite Technology Development, Inc. For added flexural properties the primary longerons 320 may have some curvature much like a carpenter's tape or may be stiffened by another mechanism such as a sandwich panel cross section with collapsed thickness for stowage.

Figure 6:
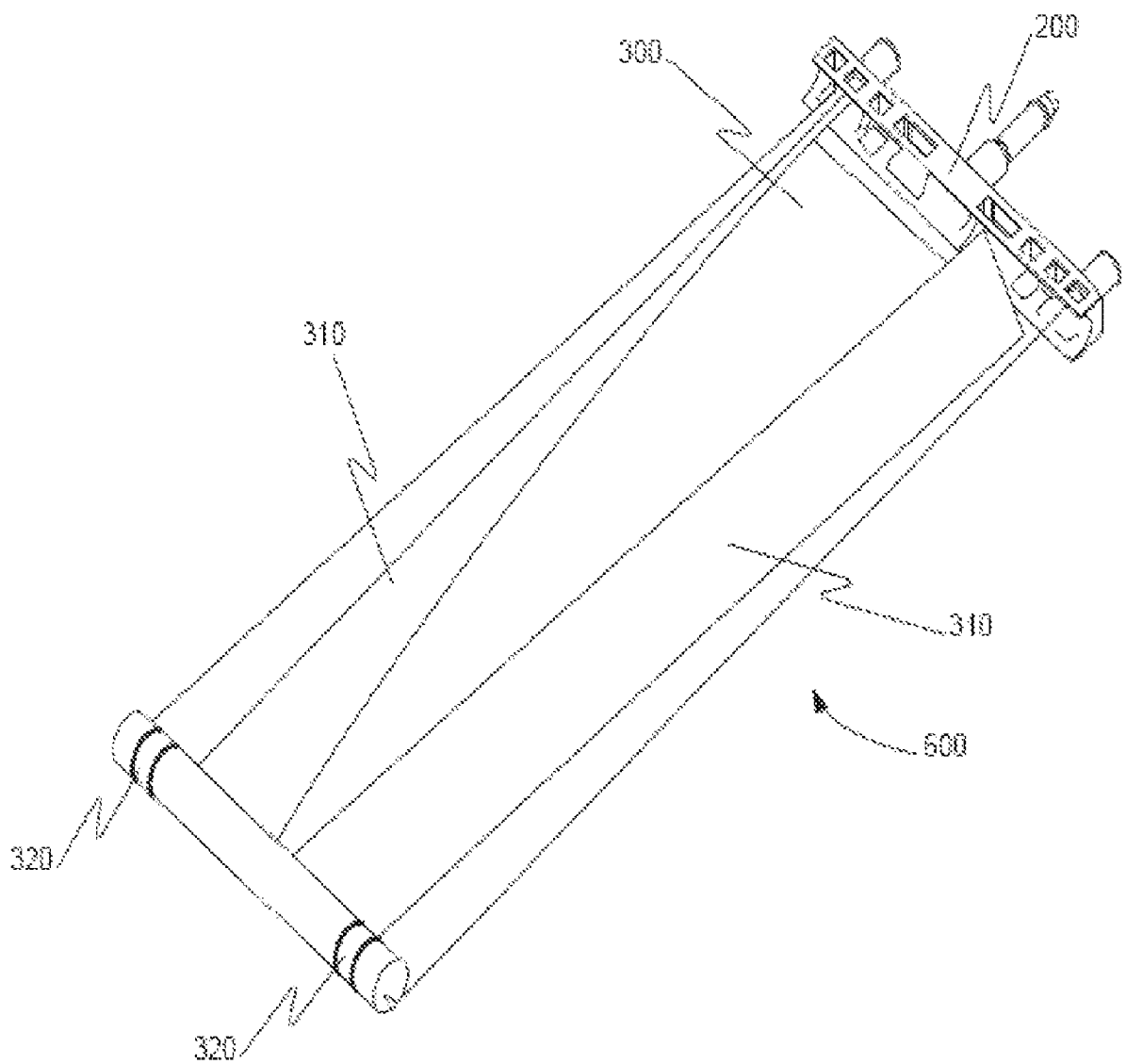
FIG. 6 shows a solar array structure being rolled according to one embodiment of the invention.

The primary longeron 320 may also act as wing hinge for the wing panels 310. The wing solar panels 310 may be folded onto the central solar panel 300 while the primary longeron 320 is flattened. This puts the three three-panel assembly (the two wing solar panels 310 and the central solar panel 300) into a single plane configuration which may then be rolled into a cylinder back to the yoke 260, as shown in FIG. 6. The rolled up array 220 may then be secured to the yoke 260 with a clamp band device 230 as shown in FIG. 2. Other mechanisms may be used to secure the rolled up array 220.

Figure 7A:
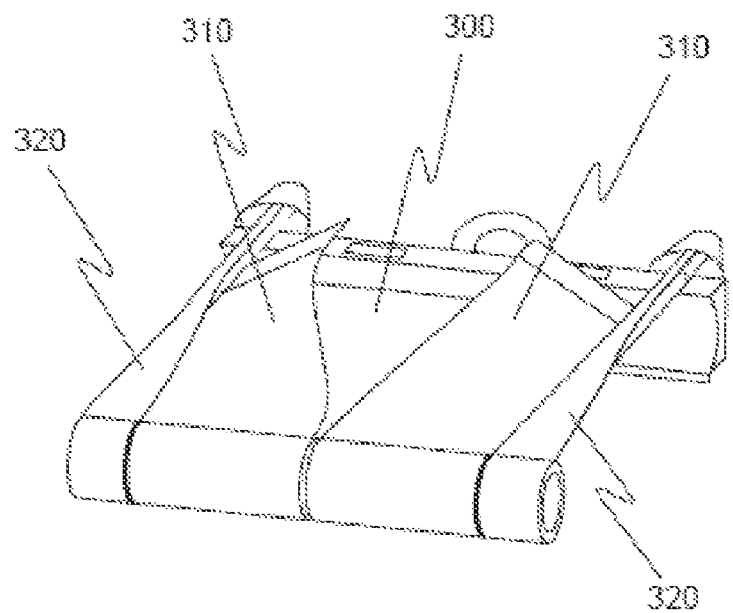
FIGS. 7A and 7B show a back-rolled and front-rolled solar array structure according other embodiments of the invention.
Figure 7B:
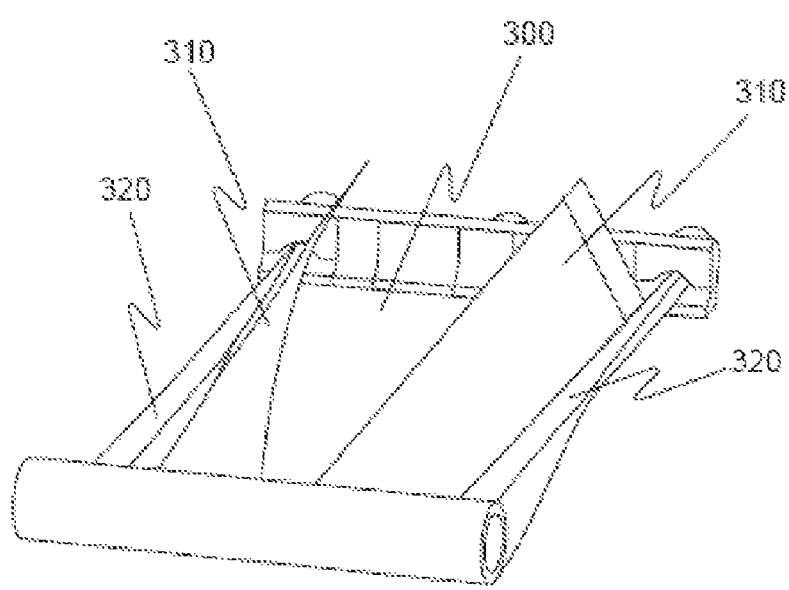

The solar arrays 300, 310 may be back-rolled as shown in FIG. 7A or front rolled as shown in FIG. 7B according to other embodiments of the invention. Back rolling occurs when the roll is above the plane of the deployed array. Front rolling occurs when the roll is below the plane of the deployed array. Moreover, the primary longerons 320 are exposed on the outside of the roll when back rolled and within the roll when front rolled. Reversing the roll direction may also change the attachment configuration of the wings to the rolled longeron.

The solar array structure 102 may be deployed by releasing the clamp band 230. The clamp band 230 provides initial kick-off force and pulls the rolled array away from the yoke 260. Additionally the clamp band 230 may provide supplementary root stiffness to the primary longeron. The deploying force is primarily derived from the strain energy stored in the rolled primary longeron; however, additional strain energy may also stored in the other frame elements, which are flattened and rolled into the stowed configuration. While the primary longeron is unrolling, the wings may deploy due to their integral nature with the primary longerons. The wings are deployed as the flattened primary longeron is restored to its preformed shape. The deploying wing solar panels 310 may provide stability during deployment. The wing solar panels 310 may also decrease the ability for the rolled array to unfurl and then roll back on itself like a yo-yo. The wing solar panels 310 may also provide some depth to the structure, which in turn may control the deployment profile. This coordinated deployment also dissipates the stored energy into multiple kinetic energy paths (left wing, right wing, unfurling tip mass). This decreases the amount of force and moment that must be reacted and controlled by the host spacecraft when the structure reaches its final deployed position. When deployment is complete, the wing to wing diagonal members will be slightly tensioned through residual strain energy in the primary longerons.

Figure 8:
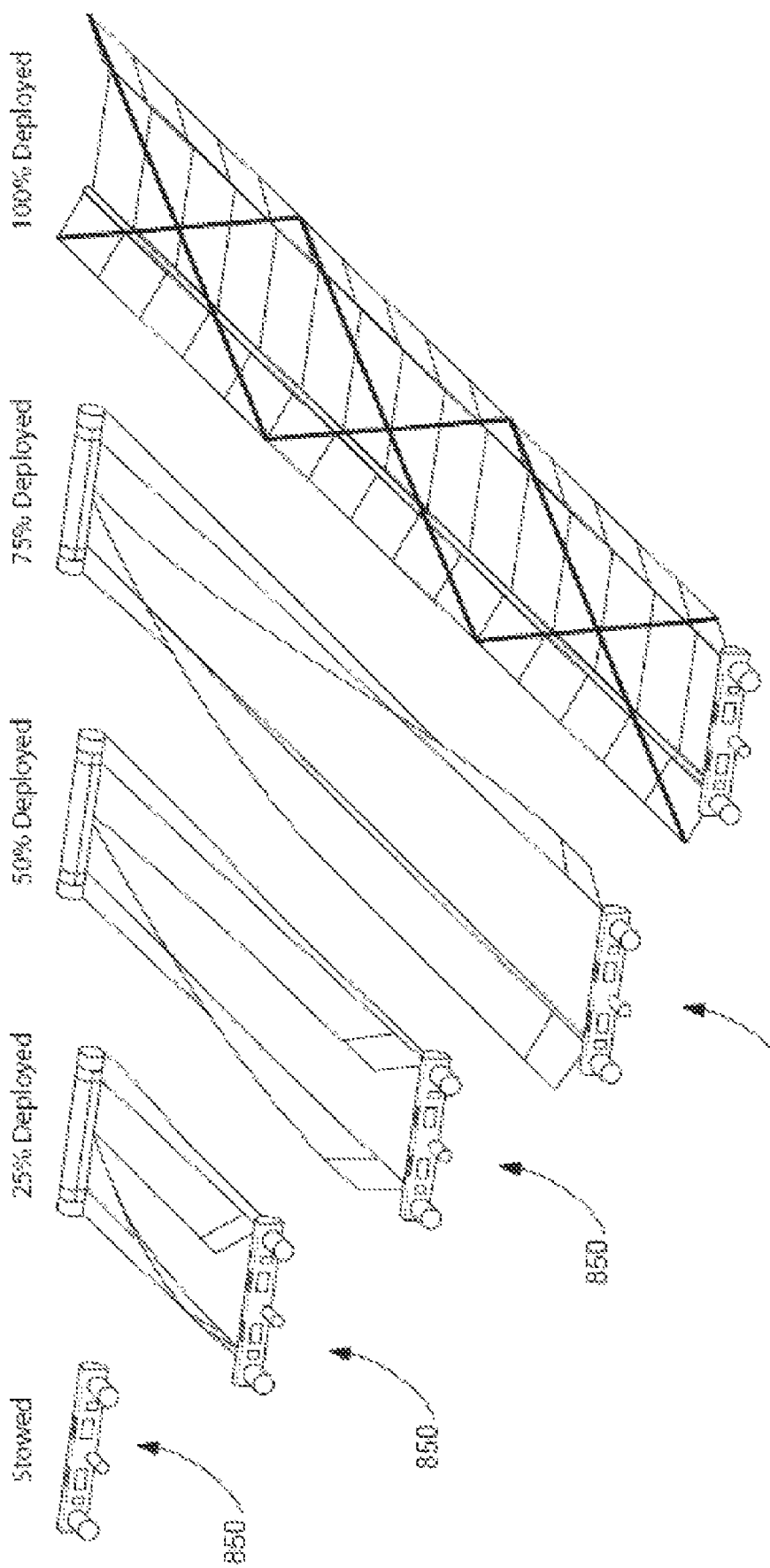
FIG. 8 shows the progression of a solar array structure from being stowed to fully deployed according to one embodiment of the invention.

FIG. 8 shows a progression as the structure is deployed according to one embodiment of the invention. The rolled array is stowed with the yoke 810. The figure then shows the solar array structure deployed over various phases from stowed 810 to 25% deployed to 50% deployed to 75% deployed to 100% deployed. The figure also shows how the wings are deployed during each stage of deployment.

Barreling and rate of deployment are controlled through the primary longeron 320. The longeron may include a bi-stable elastic design and/or include a shape memory material. The shape memory material may have integral heaters that are electronically controlled. The longerons may also be heated by solar energy. In such a case, the array may be back rolled so that the primary longerons 320 may be exposed to the sun when the array is rolled. Solar energy may then provide automatic deployment control because only the outside of the rolled longeron would be heated. The rate of unrolling would be limited because of the time required to heat the material to deployment temperature as it reaches the outside of the roll. Additional control could be added by using a spooled cable (not shown) attached to the tip of the primary longeron. The rate of cable release is controlled by a drag or braking mechanism mounted on the yoke 260.

In order for EMC material to regain its previous structure, both packaging and deployment may need to be accomplished above the materials glass transition temperature. In one embodiment, surface-bonded heaters may be used for packaging and deployment control of the slit-tube longerons. In another embodiment, solar energy may be used to deploy the solar array structures 120. Accordingly, the stowed and rolled structure may be turned toward the sun in such a way that the primary longerons 320 are heated. The heat causes the longerons to deploy by regaining a previously established shape.

FIGS. 9A-9C show a spacecraft 110 with bi-directional deployed solar array structures according to another embodiment of the invention. A space craft may have two rolled and stowed solar array structures 120 as shown in FIG. 9A. The two rolled and stowed solar array structures may begin deployment, as shown in FIG. 9B. FIG. 9C shows the two solar array structures 120 fully deployed in opposite directions. The solar array structures do not include wing solar panels.

Figure 10A:
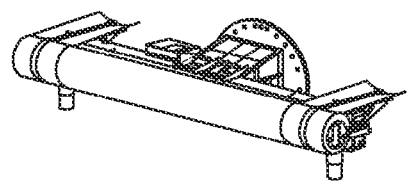
FIGS. 10A, 10B, and 10C show another embodiment of a solar array structure in a stowed, partially deployed, and fully deployed state.
Figure 10B:
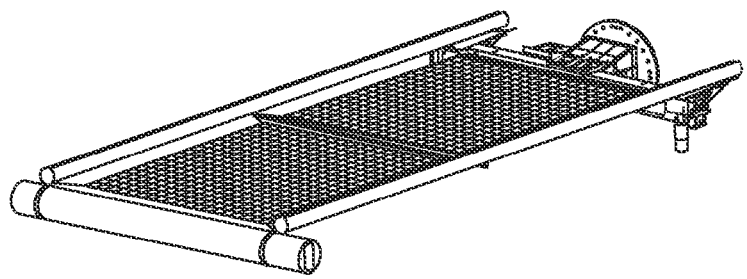
Figure 10C:
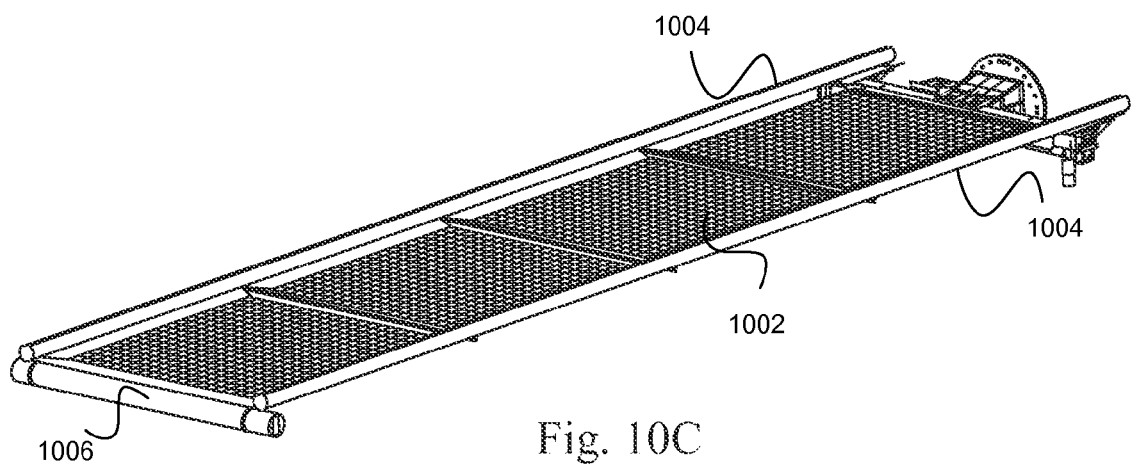

FIGS. 10A, 10B, and 10C show a stowed, partially deployed, and fully deployed solar array structure according to another embodiment of the invention. The embodiment illustrated in these figures shows a solar array structure coupled with a different yoke. The yoke may be adapted to rotate and/or position the solar array structure in a number of different positions. The yoke may be attached to a gimbal that is further attached to a satellite body. This solar array structure also includes only a central solar panel coupled with two slit-tube longerons. The central solar panel is shown including a plurality of photovoltaic cells 1001 coupled to a solar array sheet. The photovoltaic cells may be made of a rigid or semi-rigid material while the solar array sheet may be made of a flexible material. To allow the solar array sheet to bend and roll, the plurality of photovoltaic cells may be arranged so that gaps exist between each of the photovoltaic cells (shown in greater detail in FIG. 11). For example, in one embodiment, the plurality of photovoltaic cells may be arranged in rows and/or columns so that each column essentially runs along the length of the solar array structure and is roughly parallel with the longerons 1004 and so that each row essentially runs across the width of the solar array structures and is roughly parallel with an end segment 1006 of the solar array structure. A gap may exist between each row and/or each column that facilitates in bending and rolling of the solar array sheet. In another embodiment, the plurality of photovoltaic cells comprise a diamond arrangement across the surface of the solar array sheet, in which bending and rolling is facilitated due to the gaps between each of the photovoltaic cells. Any other arrangement of photovoltaic cells (e.g., irregular photovoltaic cell patterns, spiral, octagon, circular, triangle, etc.) are possible within the scope of the invention. The rows and columns may be coupled to the solar array sheet with one or more adhesives. Likewise, the photovoltaic cells may be grown or fabricated directly onto the solar array sheets, they may be vacuum deposited directly onto the sheets, they may be laminated or embedded inside the solar array sheets, or coupled via any other mechanism.

In addition, each photovoltaic cell may be completely isolated from other cells or may be coupled to one or more adjacent photovoltaic cells. For example, in one embodiment, the photovoltaic cells in each row are coupled together by a small, preferably electrically conductive, material so that a portion of the photovoltaic cells in each row, or the entire row of cells, are coupled together while individual rows are kept separate. In another embodiment all of the photovoltaic cells arranged in a diamond pattern are coupled together so that each photovoltaic cell in the solar array is coupled. The small conductive material that couples the photovoltaic cells may be flexible so that the conductive material bends when the solar array is rolled and bent. The conductive material may couple photovoltaic cells by bridging the gap between adjacent photovoltaic cells. Although FIGS. 10A, 10B, and 10C show the solar array structure as only including a central solar panel, the solar array structure could include additional solar panels that may be attached as wings and that each have a plurality of photovoltaic cells attached to a solar array sheet.

Figure 11A:
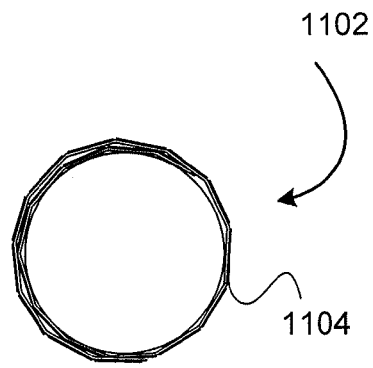
FIGS. 11A, 11B, and 11C show another embodiment of a solar array structure in a stowed, partially deployed, and fully deployed state.
Figure 11B:
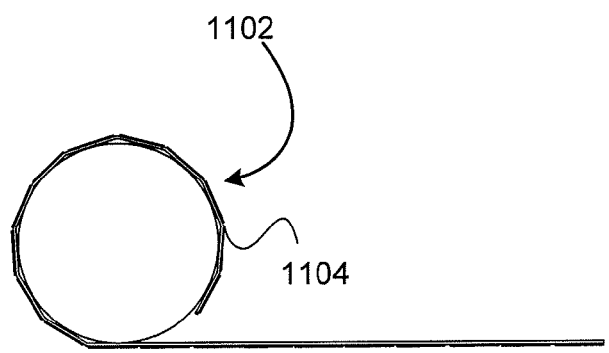
Figure 11C:
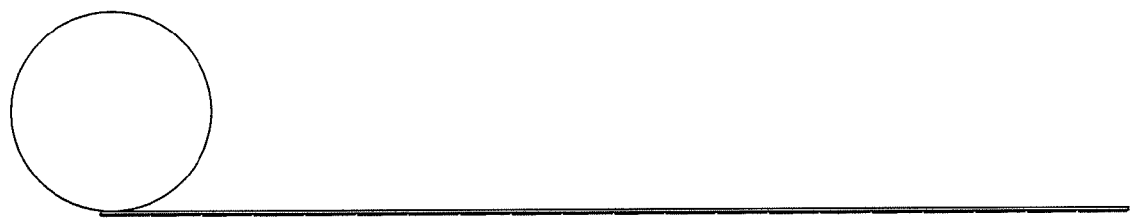

FIGS. 11A, 11B, and 11C show a side view of the solar array structure of FIG. 10 according to some embodiments of the invention. More specifically, the figures show the central solar panel, including the plurality of photovoltaic cells and solar array sheet, as stowed, partially deployed, and fully deployed. FIGS. 11A and 11B show the solar array sheet including a plurality of photovoltaic cells 1104 that may be arranged in columns and rows or any other arrangement. FIGS. 11A and 11B also show the gaps 1102 of the solar array sheet that separate the photovoltaic cells 1104 (e.g., the gaps may separate rows and/or columns of photovoltaic cells). As previously described, the photovoltaic cells 1104 are relatively rigid. The photovoltaic cells are, therefore, unable to bend as the central solar panel is rolled. In such an embodiment, the gaps 1102 that separate the photovoltaic cells 1104 may allow the central solar panel to be rolled and stowed due to the flexible material of the solar array sheet.

In one embodiment, the photovoltaic cells are arranged in columns and rows along the solar array structure so that when the central solar panel is fully deployed (FIG. 11C), the photovoltaic cells in each column and row essentially touch the photovoltaic cells in adjacent columns and rows so that when deployed, the plurality of photovoltaic cells essentially form a large solar array. In another embodiment, the photovoltaic cells are arranged in an octagonal pattern so that a majority of photovoltaic cells touch to form a large solar array when the central solar panel is fully deployed. In some embodiments, rolling and stowing of the central solar panel is facilitated by leaving the solar array sheet and photovoltaic cells uncoupled along the edges of the photovoltaic cells so that the solar array sheet directly under the edges of the photovoltaic cell bends.

Figure 12:
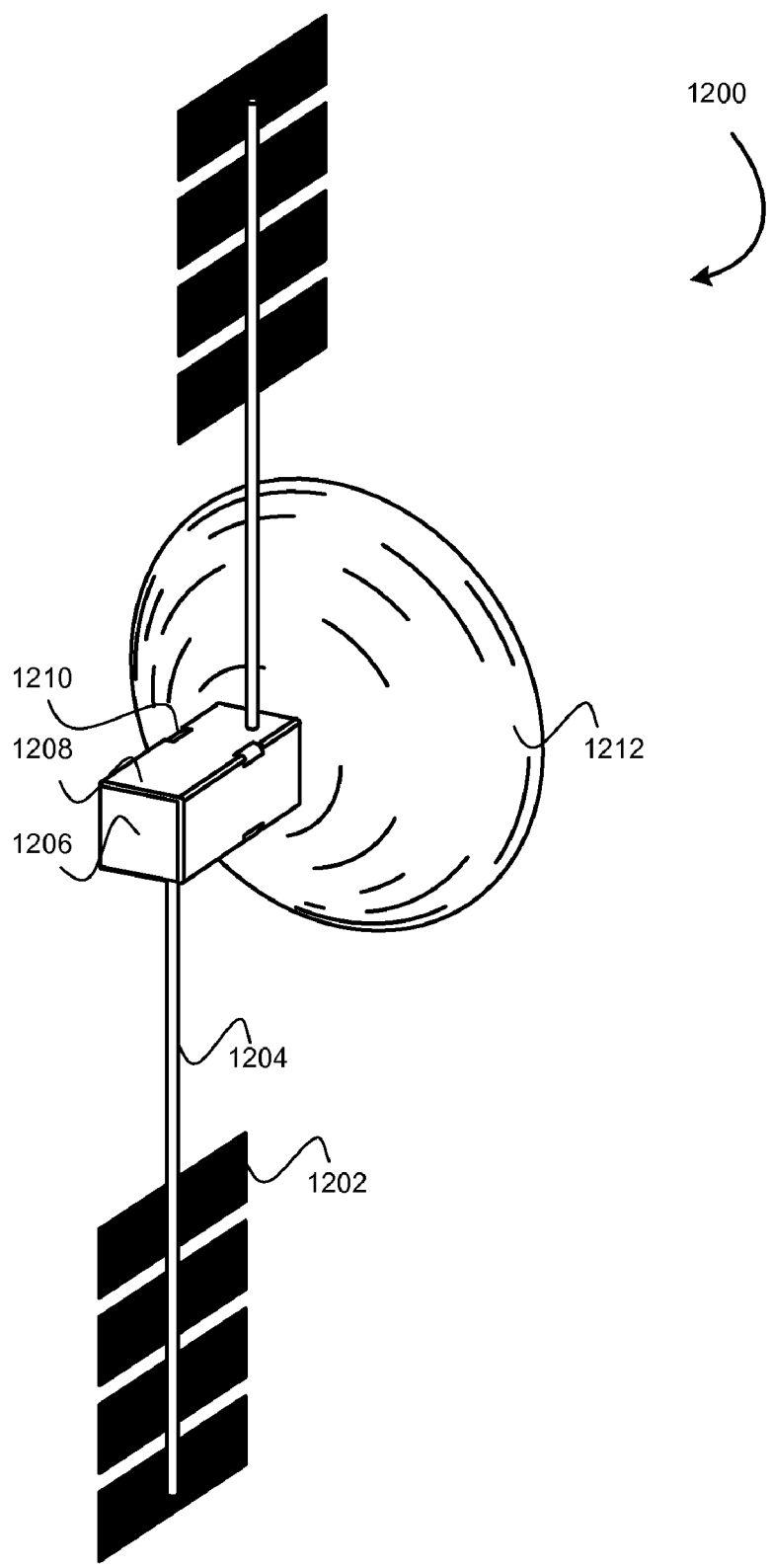
FIG. 12 shows a perspective view of another embodiment of a solar array structure that includes a primary longeron and a plurality of flat solar panels.

FIG. 12 shows another embodiment of a solar array structure 1200. The solar array structure includes a pair of primary longerons 1204 with a plurality of flat panels 1202 coupled with each of the primary longerons 1204. The flat panels may include solar arrays, radio frequency antennas, planar arrays, phased arrays, etc. For ease of description, the flat panels are generally referred to herein as "flat panels" or "flat solar panels." It should be noted, however, that this description includes any kind of array (e.g., solar arrays, radio frequency antennas, planar arrays, phased arrays, etc) and is not limited to solar panels. The primary longerons are independent from each other and each primary longeron is coupled with a satellite structure 1206. The primary longerons 1204 and plurality of flat solar panels 1202 are configured to wrap around the outer surface 1208 of the satellite structure 1206 as shown in FIGS. 13 and 14. The outer surface 1208 of the satellite structure 1206 may include one or more flat surfaces, which the flat solar panels may rest against when stowed. The plurality of flat solar panels 1202 may be coupled to the primary longerons 1204 so that a gap separates each of the flat solar panels along the length of the primary longerons 1204. In one embodiment, the satellite structure comprises a notional sized CubeSat satellite. The notional sized CubeSat satellite may be coupled with a communication antennae 1212.

The primary longerons 1204 may be constructed so that they may be flattened and rolled for stowage while regaining their original cross-section during deployment. The primary longerons 1204 may be a long tube with one or more slits. The slits may allow the tube to be flattened and rolled. In addition, each of the primary longerons 1204 may rotate so that, when deployed, the plurality of flat solar panels always face the sun during orbit (i.e., maintains solar pointing). The primary longerons 1204 may also include a joint (not shown) that may be positioned adjacent to the flat solar panels 1202 and that may allow the portion of the primary longeron from the joint to the satellite structure 1206 to rotate while minimizing rotation in the portion of the primary longeron from the joint to the end of the longeron opposite to the satellite structure.

Figure 13A:
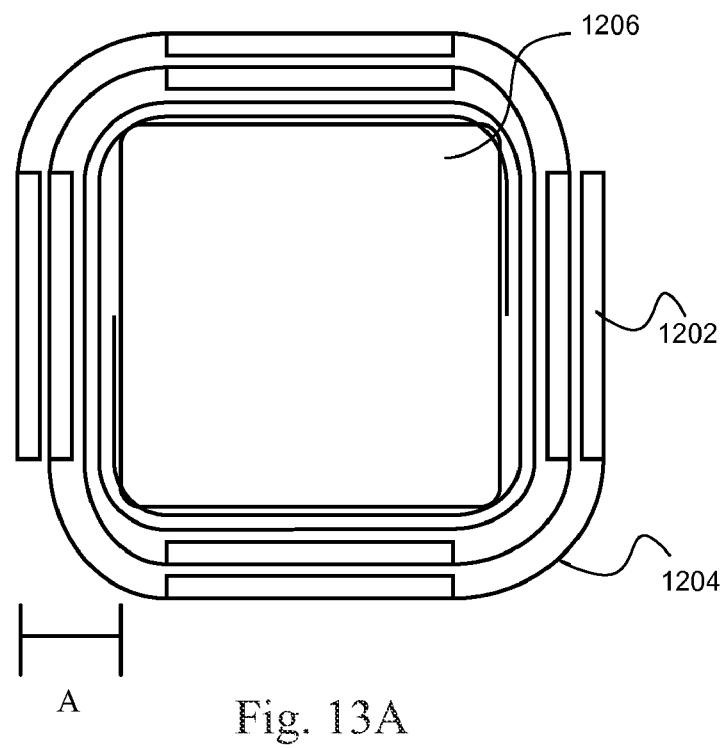
FIGS. 13A and 13B show a side view and a perspective view, respectively, of a stowed solar array structure with the primary longeron and flat solar panels rolled around a satellite.
Figure 13B:
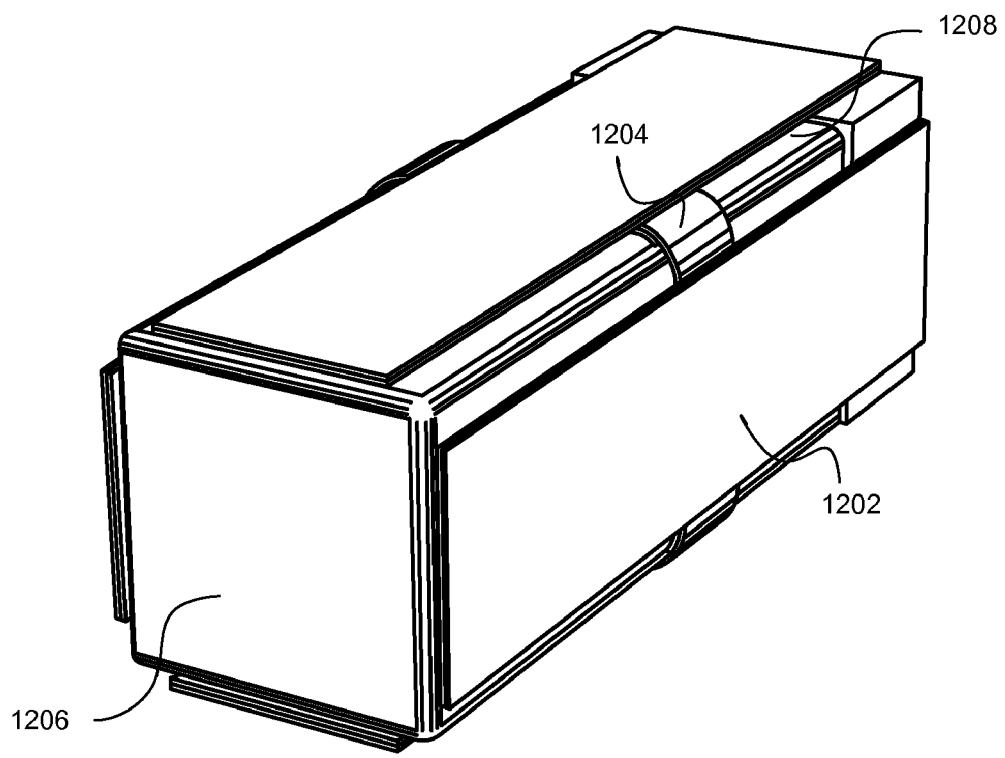

FIGS. 13A and 13B show the solar array structure in a stowed position with the plurality of flat solar panels 1202 and primary longerons 1204 wrapped around the satellite structure 1206. FIG. 13B shows a perspective view of the stowed solar array structure with multiple flat solar panels 1202 stacked atop one another and stacked adjacent to the flat surfaces of the satellite structure's outer surface 1208. In some embodiments, the flat solar panels 1202 are made of a stiff or rigid material. Stacking the flat solar panels 1202 adjacent to the flat surfaces allows rigid solar panels to be used while minimizing stowage space of the solar array structure. FIG. 13B also shows the primary longerons 1204 flattened and wrapped around the outer surface 1208 of the satellite structure 1206. When the solar array structure is stowed, the portions of the flattened primary longerons 1204 that are not coupled with the flat solar panels 1202 bend around the outer surface 1208 of the satellite structure 1206. The edges of the outer surface 1208 may include one or more radii (i.e., chamfered sections—element 1210 of FIG. 12) in which the flattened and bent primary longerons 1204 may reside when wrapped about the outer surface 1208 of the satellite structure 1206.

FIG. 13A shows a side view of the stowed solar array structure of FIG. 13B. The figure specifically shows the flattened primary longerons 1204 bending around the outer surface 1208 of the satellite structure 1206 and the flat solar panels 1202 stacked atop one another adjacent to the flat surfaces of the satellite structure's outer surface. As shown in the figure, the primary longerons 1204 may fully wrap around the outer surface 1208 of the satellite structure one or more times before the first flat solar panel 1202 rests adjacent to the outer surface. When stowed, the stacked flat solar panels 1202 and rolled primary longerons 1204 extend a thickness A from the outer surface 1208 of the satellite structure 1206. The thickness A depends primarily on the type of flat solar panels 1202 and primary longerons 1204 used. In one embodiment, such as when the satellite structure comprises a notional sized CubeSat satellite, the flat solar panels 1202 and primary longeron 1204 materials are selected so that the thickness A is roughly 0.215 inches.

The cross sectional shape and dimensions of the stowed solar array structure are such that the solar array structure easily fits within and is ejectable from standard P-POD CubeSat launchers, such as the microsatellite launcher of California Polytechnic State University located in San Luis Obispo, Calif. For example, the chamfered sections (element 1210) in which the longerons reside, prevent the longerons from contacting the inner surfaces of the P-POD CubeSat launcher, thereby preventing the longerons from damage during ejection.

Figure 14C:
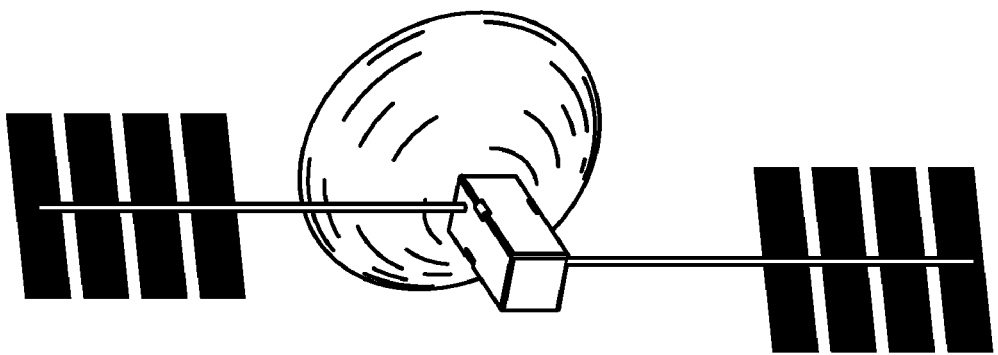
FIGS. 14A, 14B, and 14C show side and perspective views of a solar array structure in a stowed state, in a partially deployed state, and in a fully deployed state.
Figure 14B:
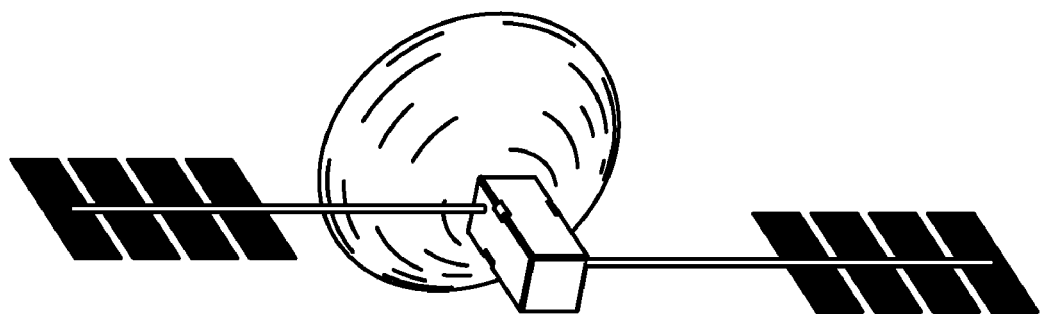
Figure 14A:
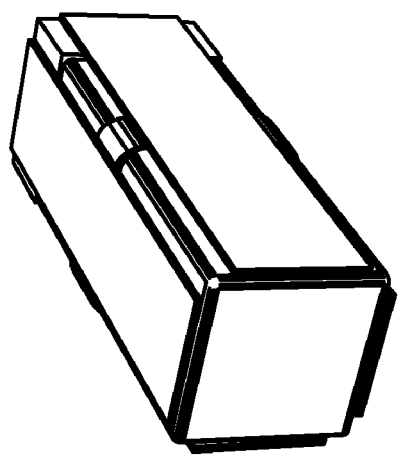

FIGS. 14A, 14B, and 14C show the solar array structure in a stowed state and deployed state. FIG. 14A is similar to FIG. 13B in that the figure shows the flat solar panels stacked atop one another and stacked adjacent to flat surfaces of the satellite structure with the flattened primary longerons wrapping and bending around the outer surface of the satellite structure. FIG. 14B shows the primary longerons and flat solar panels fully deployed from the stowed state with the flat solar panels and primary longerons in a natural or un-rotated stated (i.e., the flat solar panels have not rotated about an axis of the primary longeron). FIG. 14C shows the primary longerons and flat solar panels fully deployed with the flat solar panels rotated in relation to the satellite structure (i.e., rotated about the axis of the primary longeron). Rotation of the primary longerons, and thus the flat solar panels, may be achieved through a variety of means including actuators and/or motors at the base of the primary longerons that rotate the entire longeron and/or by a shear force applied to the primary longeron through the use of an actuator, motor, piezo-electric fiber, shape memory wires, etc. In this manner, the orientation of the flat solar panels may be changed in relation to the satellite structure so that the flat solar panels face the sun during orbit (i.e., maintain solar pointing). In addition, the primary longerons may also include a joint (not shown) that allows a portion of the primary longeron to rotate while minimizing the rotation in another portion of the primary longeron. For example, the joint may be located adjacent to the first flat solar panel encountered along the length of the primary longeron from the satellite. In response to an applied rotational force (i.e., a shear force), the joint may allow rotation in the primary longeron from the satellite structure up to the joint while minimizing the amount of rotation in the primary longeron from the joint to the end of the primary longeron opposite the satellite structure. The joint may include one or more slits or cuts (e.g., circumferential cuts) in the primary longerons.

Figure 16:
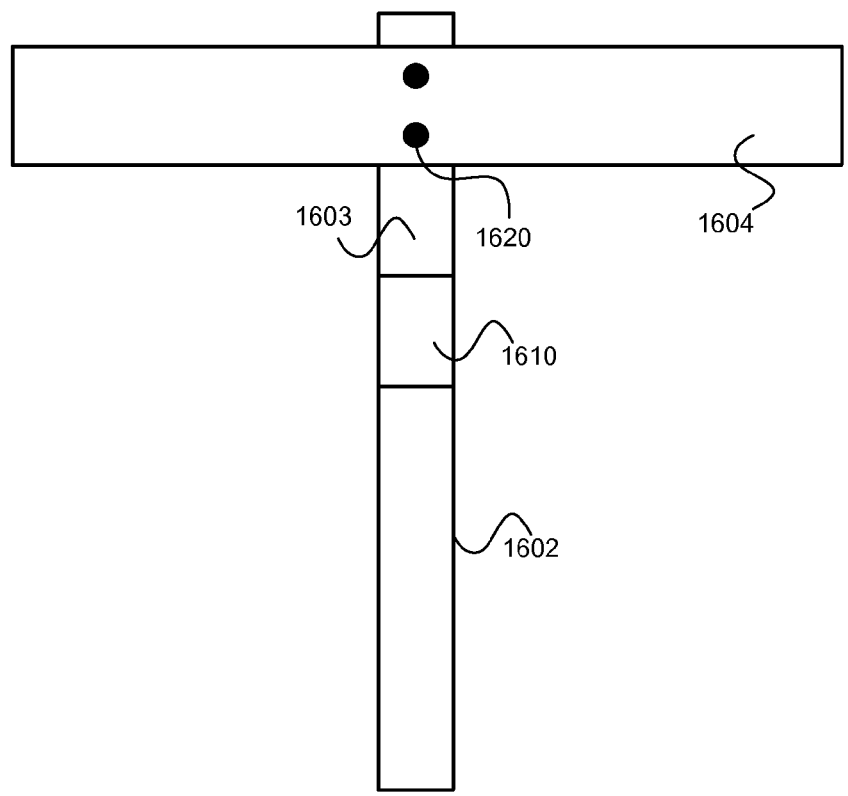
FIG. 16 shows a flat panel coupled with a longeron having a shear compliant joint according to one embodiment of the invention.
Figure 17:
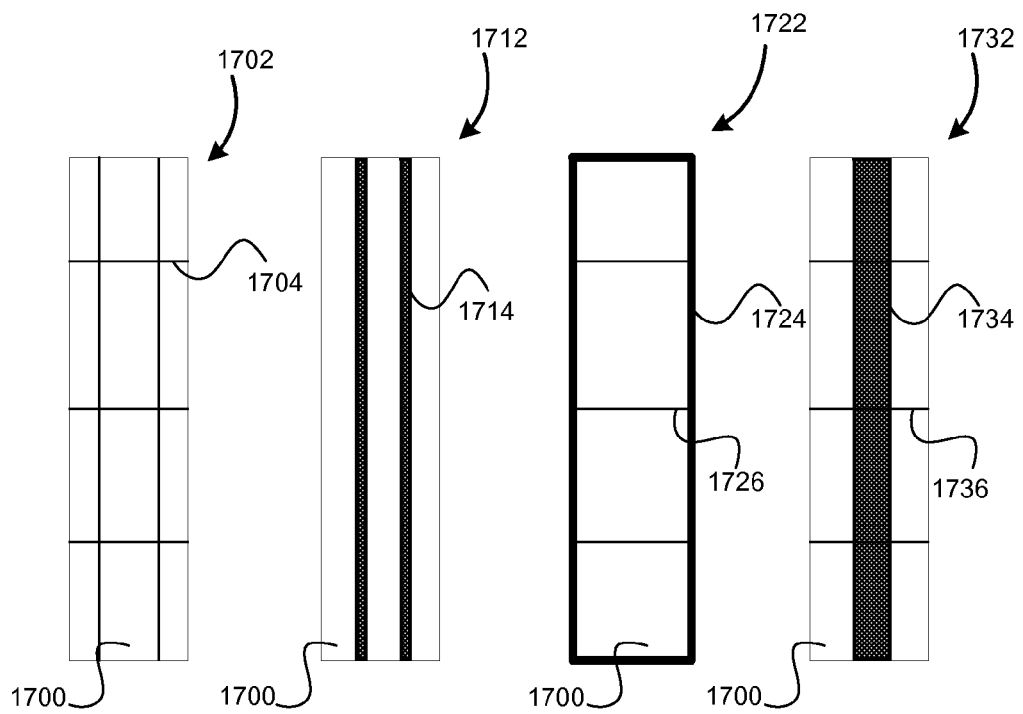
FIG. 17 shows different configurations of the flat panel according to various embodiments of the invention.

Alternatively or additionally, the joint may be fabricated by exploiting the anisotropic properties of the composite longeron. For example, as shown in FIG. 16, the joint could be created by designing a joint/portion 1610 of the longeron (i.e., composite laminate) to be shear compliant and restricting the twist or shear of the longeron 1603 above the joint 1610. Twist and/or shear could be restricted in the upper portion of the longeron 1603 by using an appropriate fastening mechanism to attach the flat panel(s) 1604 to the longeron 1603, such as by using two shear resisting mechanical fasteners 1620 shown in FIG. 16 or by the use of proper adhesives. In one embodiment, the joint 1610 includes an elastomeric rubber. The joint 1610 may permit the lower portion of the longeron 1602 to twist or rotate or, alternatively, the twisting or rotation can be substantially limited to the joint 1610. The longeron and/or joint may or may not include a slit as described above.

The flat panels and primary longerons are configured to deploy from the stowed state by unwrapping from around the outer surface of the satellite structure. As the primary longerons and flat panels unwrap, the primary longerons regain their original cross sectional shape. In one embodiment, the original cross section of the primary longerons is roughly circular so that the fully deployed primary longeron forms a tubular member. The tubular shape reinforces the primary longeron and facilitates in maintaining a straight orientation when deployed. In such embodiments, as the primary longerons unroll, the cross section changes from flat to circular.

Figure 15:
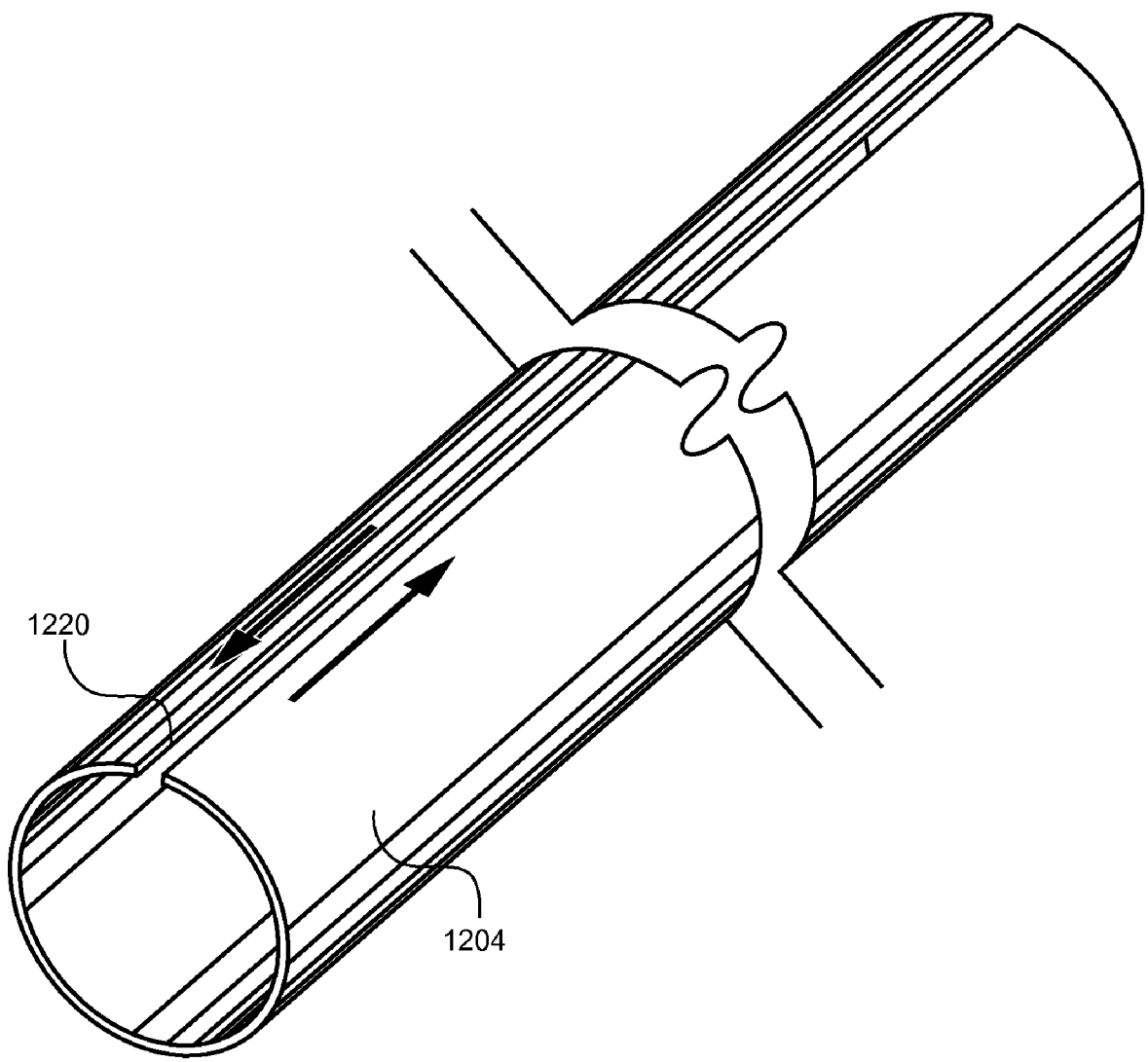
FIG. 15 shows a primary longeron including a slit along the longitudinal length of the primary longeron according to one embodiment of the invention.

FIG. 15 shows a close up of a primary longeron 1204 that includes a slit 1220 along the longitudinal length of the longeron. The primary longeron 1204 has a roughly circular cross section so that when deployed, the longeron has a tubular or cylindrical shape. The primary longeron 1204 is constructed so that it may be flattened and wrapped for stowage while regaining the original circular cross-sectional shape during deployment. The slit may allow the tube to be flattened and wrapped. The primary longeron 1204 may be constructed from any elastic material or memory material, such as, for example, a metal, a composite, or a polymer. Many shape memory materials are known in the art. For example, the primary longeron 1204 may comprise copper-zinc-aluminum, copper-aluminum-nickel, or nickel-titanium alloys. In another embodiment of the invention, the primary longeron 1204 may be constructed from an elastic memory composite (EMC) material, such as, for example, TEMBO®, which is commercially available from Composite Technology Development, Inc. For added flexural properties the primary longeron 1204 may have some curvature much like a carpenter's tape or may be stiffened by another mechanism such as a sandwich panel cross section with collapsed thickness for stowage.

To facilitate rotation of the primary longeron 1204, and thereby facilitate an orientation change in the coupled flat solar panels, a shear force may be applied along the slit of the primary longeron (shown by the arrows along the slit). The shear force may be provided through a variety of force applicators including mechanical actuators or motors at the base of the primary longeron, piezo-electric fibers embedded along the length of the primary longeron and/or slit, shape memory wires embedded along the length of the primary longeron and/or slit, etc. The shear force may be applied along a portion of the length of the slit or applied to the entire length of the slit. For example, in some embodiments, a shape memory wire or piezo-electric fiber may be embedded along the length of the slit from the satellite structure to roughly the first flat solar panel so that a rotational force may be provided along the length of the primary longeron up to the first flat solar panel. In contrast, a motor may be used at the base of the primary longeron so that the shear force is applied only at the base of the primary longeron. In other embodiments, a shape memory wire or piezo-electric fiber may extend along a shorter length of the slit or along the entire length of the slit.

The shear force may also be provided by altering the internal stresses within the longeron. For example, the internal stresses may be altered by using a resin having a different coefficient of thermal expansion than the fiber reinforcement. Using such a resin and fiber layer will change the internal thermal stresses within the longeron at different temperatures. As these stresses change, they may warp the longeron so that the longeron twists or rotates in response. The temperature can be varied through natural conditions (e.g., sunlight) and/or through artificial conditions (e.g., heater). Further, the piezo-electric fiber (or other force/twist actuator) may additionally be used to actively dampen out jitter or structural excitations in the longeron and/or solar array structure.

Similarly, a piezo-electric fiber and/or shape memory wire may be applied to both sides of the slit so that a force is applied to both sides of the slit. In addition, a voltage sensor may be coupled with the solar array structure (i.e., flat solar panel, primary longeron, and/or satellite structure) and the force applicator (i.e., piezo-electric fiber, shape memory wire, motor, etc.) to facilitate rotation of the primary longerons and flat solar panels. The voltage sensor may enable rotation of the flat solar panels until a voltage is optimized. The optimized voltage may indicate a maximum amount of sunlight striking the flat solar panel array. In some embodiments, the voltage sensor may sense a voltage produced by the flat solar panel array. The voltage produced by the flat solar panel array may drive the force applicator to enable rotation of the primary longerons and flat solar panels (e.g., may provide the shear force). In other embodiments, the voltage sensor may be coupled to a mechanism that provides a voltage to the force applicator or the voltage sensor may provide the voltage to the force applicator.

Stowing and rate of deployment of the longerons and flat solar panels may be controlled through the primary longeron 1204. The longeron may include a bi-stable elastic design and/or include a shape memory material. Additionally or alternatively, the longeron may inlucde a viscoelastic material, or portions made of viscoelastic material, to dampen the deployment of the longerons and/or flat panels. The shape memory material may have integral heaters that are electronically controlled. The longeron may also be heated by solar energy as previously described. The primary longeron 1204 and flat solar panels may be stowed so that the primary longeron is exposed to the sun when the array is wrapped about the satellite structure. Solar energy may then provide automatic deployment control as the primary longeron 1204 is heated. The rate of deployment may be controlled as previously described.

FIG. 16 shows various configurations of the flat panel 1700. As noted above, the flat panel 1700 may include any kind of array, for example solar arrays, radio frequency antennas, planar arrays, phased arrays, etc. The flat panel 1700 may be made of a polymide film/substrate such as Kapton®. Photovoltaic cells or other materials may be coupled with or otherwise attached to the Kapton substrate. The Kapton substrate may be reinforced using one or more rigid structures, spars, panels, struts, boxes, etc. as shown in by flat panels 1702, 1712, 1722, and 1732. For example, the flat panel of 1702 shows a Kapton substrate 1700 coupled with a plurality of longitudinally and laterally extending spars 1704 that provide structural support to the Kapton substrate. The spars 1704 may includes metallic or composite wires or tubes or any other material.

The flat panel of 1712 shows the Kapton substrate 1700 coupled with a pair of rigid spars or struts 1714 extending longitudinally along the flat panel. The pair of rigid spars or struts may be coupled with the longeron so that the upper portion of the longeron resists twist or rotation as described previously. The flat panel of 1722 shows a frame 1724 extending around the perimeter of the Kapton substrate 1700 to provide structural support. The frame 1724 may include one or more laterally extending spars 1726 that provide additional support. The flat panel of 1732 shows the Kapton substrate 1700 coupled with a single longitudinally extending central strut or spar. The single strut or spar may be made of the composite material of the longerons or any other material. The single strut or spar may include one or more laterally extending spars that provide additional support. The longeron of the solar array structure may couple with the spars, struts, frame, etc. described above to couple the flat panel to the solar array structure.

Having fully described several embodiments of the present invention, many other equivalent or alternative methods of producing the cladding layers of the present invention will be apparent to those of skill in the art. These alternatives and equivalents are intended to be included within the scope of the invention, as defined by the following claims.

What is claimed is:

1. A deployable structure comprising:
    a slit-tube longeron, wherein the slit-tube longeron comprises a tubular member that includes a slit along the longitudinal length of the slit-tube longeron; and
    a first flat panel coupled with the slit-tube longeron;
    wherein:
        the deployable structure is configured to couple with a satellite;
        the deployable structure is configured to transform between a stowed state and a deployed state;
        when the deployable structure is in the deployed state, the tubular member of the slit-tube longeron is substantially straight; and
        when the deployable structure is in the stowed state, the tubular member of the slit-tube longeron is wrapped around the satellite such that the tubular member bends around the satellite.

2. The deployable structure of claim 1, wherein the deployable structure is coupled with the satellite.

3. The deployable structure of claim 1, wherein when the deployable structure is in the stowed state, the first flat panel is positioned adjacent a flat surface of the satellite such that the first flat panel lays substantially flat adjacent the flat surface.

4. The deployable structure of claim 3, wherein a portion of the slit-tube longeron coupled with the first flat panel does not bend when the deployable structure is in the stowed state.

5. The deployable structure of claim 1, wherein the slit-tube longeron comprises a shape memory material.

6. The deployable structure of claim 1, wherein:
    when the deployable structure is in the deployed state, the tubular member comprises a substantially circular cross section along the longitudinal length of the slit-tube longeron; and
    the slit of the tubular member allows the tubular member to flatten such that the tubular member is substantially flat along the longitudinal length of the slit-tube longeron.

7. The deployable structure of claim 1, wherein:
    the deployable structure further comprises a second flat panel coupled with the slit-tube longeron, and
    when the deployable structure is in the stowed state, the first flat panel and the second flat panel lay substantially flat adjacent to the outer surface of the satellite.

8. The deployable structure of claim 7, wherein:
    the first flat panel and the second flat panel are coupled along the longitudinal length of the slit-tube longeron;
    the first flat panel and the second flat panel are longitudinally separated by a portion of the tubular member; and
    the portion of the tubular member separating the first flat panel and second flat panel bends around the outer surface of the satellite when the deployable structure is in the stowed state.

9. The deployable structure of claim 1, further comprising a force applicator configured to apply a force to the slit-tube longeron to change an orientation of the first flat panel along the longitudinal length of the slit-tube longeron.

10. The deployable structure of claim 9, wherein the force applicator provides a shear force along the slit of the tubular member.

11. The deployable structure of claim 9, wherein the force applicator comprises one or more of the following:
    a piezoelectric material;
    a mechanical actuator;
    a motor;
    internal thermal stresses; and
    a shape memory wire.

12. The deployable structure of claim 9, wherein the applied force comprises a shear force applied along the slit of the tubular member such that the tubular member rotates along the entire longitudinal length of the slit-tube longeron in response to the applied force.

13. The deployable structure of claim 9, wherein:
the applied force comprises a shear force applied along the slit of the tubular member, and
the slit-tube longeron comprises a joint that allows a portion of the tubular member to rotate along the longitudinal length of the slit-tube longeron in response to the applied force while reducing the rotation in another portion of the tubular member.

14. The deployable structure of claim 1, wherein the first flat panel comprises a solar array.

15. The deployable structure of claim 1, wherein transforming from the stowed state to the deployed state comprises unwrapping the tubular member from around the satellite body such that the tubular member is substantially straight having a roughly circular cross section along the longitudinal length of the slit-tube longeron.

16. The deployable structure of claim 15, wherein transforming from the stowed state to the deployed state occurs automatically.

17. A method for stowing a deployable structure having a slit-tube longeron and a first flat panel, the method comprising:
coupling the first flat panel with the slit-tube longeron, wherein the first flat panel is coupled toward a first end of the slit-tube longeron;
coupling the deployable structure with a satellite, wherein a second end of the slit-tube longeron is coupled with the satellite; and
wrapping the slit-tube longeron around the satellite such that the slit-tube longeron bends around the outer surface of the satellite.

18. The method for stowing a deployable structure of claim 17, further comprising deploying the deployable structure, wherein deploying the deployable structure comprises:
unwrapping the slit-tube longeron from around the satellite such that the slit-tube longeron is roughly straight having a roughly circular cross section along a longitudinal length of the slit-tube longeron.

19. The method for stowing a deployable structure of claim 17, wherein:
the slit-tube longeron comprises a tubular member that includes a slit along a longitudinal length of the slit-tube longeron; and
the method further comprises coupling a force applicator with the slit-tube longeron, wherein the force applicator provides a shear force along the slit of the tubular member to change an orientation of the first flat panel in relation to the satellite.

20. The deployable structure of claim 19, wherein:
in response to the shear force provided by the force applicator, the second end of the slit-tube longeron rotates along the longitudinal length of the slit-tube longeron to change the orientation of the first flat panel; and
the slit-tube longeron comprises a joint that allows the second end of the slit-tube longeron to rotate while reducing rotation in the first end of the slit-tube longeron.

21. A flexible solar array sheet configured for coupling with a slit-tube longeron, wherein the flexible solar array sheet comprises:
a first end;
a second end opposite the first end;
a first side;
a second side opposite the first side, wherein the flexible solar array sheet is roughly rectangular having a surface defined by the first end, the second end, the first side, and the second side; and
a plurality of photovoltaic cells coupled with the flexible solar array sheet;
wherein:
each photovoltaic cell of the plurality of photovoltaic cells is separated from an adjacent photovoltaic cell by a gap that comprises a portion of the flexible solar array sheet,
the plurality of photovoltaic cells are arranged across the surface of the flexible solar array sheet so as to allow the flexible solar array sheet and the plurality of photovoltaic cells to be stowed as a roll due to the flexibility of the flexible solar array sheet in each of the gaps, and
the roll is configured to deploy by being rolled along the length of the solar array sheet.

22. The solar array of claim 21, wherein the plurality of photovoltaic cells are arranged in columns and rows, and wherein each column is roughly parallel with the first side and each row is roughly parallel with the first end.

23. The solar array of claim 22, wherein a gap separates each row from an adjacent row.

24. The solar array of claim 22, wherein the photovoltaic cells in each row are coupled together with a conductive material.

25. The solar array of claim 21, further comprising a slit-tube longeron coupled with the solar array sheet, wherein:
when coupled with the solar array sheet, the slit-tube longeron is roughly parallel with the first side, and
the slit-tube longeron is configured to stow as a roll with the solar array sheet and the plurality of photovoltaic cells by rolling the slit-tube longeron, the solar array, and the plurality of photovoltaic cells along the length of the solar array sheet.

26. The solar array of claim 25, further comprising a gimbal mount coupled with the slit-tube longeron.

27. The solar array of claim 26, further comprising a satellite coupled with the gimbal mount, thereby coupling the slit-tube longeron and solar array sheet with the satellite.

28. A deployable structure comprising:
a slit-tube longeron, wherein the slit-tube longeron comprises a tubular member that includes a slit along the longitudinal length of the slit-tube longeron;
a flat solar array sheet coupled with the slit-tube longeron; and
a plurality of photovoltaic cells coupled with the flat solar array sheet;
wherein:
the slit-tube longeron and the flat solar array sheet are stowed as a roll comprising the one or more slit-tube longerons and the flat solar array sheet, and
the roll is configured to deploy by being rolled along the longitudinal length of the slit-tube longeron.

* * * * *